(12) United States Patent
Jung et al.

(10) Patent No.: US 12,395,032 B2
(45) Date of Patent: Aug. 19, 2025

(54) BRUSHLESS DIRECT CURRENT BLOWER MOTOR HAVING STATOR WITH HEAT DISSIPATING STRUCTURE

(71) Applicant: Hyoseong Electric, Co., Ltd., Busan (KR)

(72) Inventors: Jin Gun Jung, Busan (KR); Chi Won Moon, Busan (KR); Seokmin Kim, Busan (KR)

(73) Assignee: Hyoseong Electric, Co., Ltd., Busan (KR)

( * ) Notice: Subject to any disclaimer, the term of this patent is extended or adjusted under 35 U.S.C. 154(b) by 0 days.

(21) Appl. No.: 18/617,857

(22) Filed: Mar. 27, 2024

(65) Prior Publication Data
US 2024/0333063 A1    Oct. 3, 2024

(30) Foreign Application Priority Data
Mar. 29, 2023    (KR) .......................... 10-2023-0041303

(51) Int. Cl.
  *H02K 3/34*    (2006.01)
  *H02K 1/16*    (2006.01)
  *H02K 7/08*    (2006.01)
(52) U.S. Cl.
  CPC .............. *H02K 3/345* (2013.01); *H02K 1/16* (2013.01); *H02K 7/083* (2013.01); *H02K 2203/03* (2013.01)

(58) Field of Classification Search
  CPC .............. H02K 1/187; H02K 3/32–38; H02K 2203/03; H02K 2203/12; H02K 2211/03
  See application file for complete search history.

(56) References Cited

U.S. PATENT DOCUMENTS

| | | | |
|---|---|---|---|
| 10,523,069 B2 | 12/2019 | Bielesch et al. | |
| 2015/0349593 A1* | 12/2015 | Jiang | H02K 1/187 310/43 |
| 2016/0226330 A1* | 8/2016 | Li | H02K 11/33 |
| 2018/0226856 A1 | 8/2018 | Ueda | |
| 2022/0388599 A1 | 12/2022 | Lee | |

FOREIGN PATENT DOCUMENTS

| | | |
|---|---|---|
| KR | 10-2016-0016242 A | 2/2016 |
| KR | 10-1755881 B1 | 7/2017 |
| KR | 10-1973380 B1 | 8/2019 |
| KR | 10-2183072 B1 | 11/2020 |
| KR | 10-2189837 B1 | 12/2020 |
| WO | 2012-133073 A1 | 10/2012 |

* cited by examiner

*Primary Examiner* — Oluseye Iwarere
*Assistant Examiner* — Minki Chang
(74) *Attorney, Agent, or Firm* — Revolution IP, PLLC

(57) ABSTRACT

A blower motor according to the present invention includes a stator assembly 1 including a stator core 10, an upper insulator 11 coupled to an upper portion of the stator core 10, and a lower insulator 12 coupled to a lower portion of the stator core 10; a rotor assembly 2 rotating around the stator assembly 1; a stator block 3 to which the stator assembly 1 is coupled; a printed circuit board 4 located at a lower portion of the stator block 3; and a motor cover 5 coupled to the stator block 3.

11 Claims, 7 Drawing Sheets

BRUSHLESS DIRECT CURRENT BLOWER MOTOR HAVING STATOR WITH HEAT DISSIPATING STRUCTURE

BACKGROUND OF THE INVENTION

Technical Field

The present invention relates to a blower motor used in an air conditioning system for a vehicle, etc. More specifically, the present invention relates to a blower motor applying a stator assembly with a novel structure, thereby making the blower motor compact and light weight, and also preventing overheating of the motor.

Background Art

In general, vehicles need to introduce hot or cool air thereinto to control the temperature or humidity inside the vehicles, and the air for controlling the temperature and humidity is circulated by rotation of a blower fan. The blower fan is driven by a blower motor.

The blower motor includes a rotor, a stator and a housing accommodating the stator and the rotor. When current is applied to a coil wound around the stator core, the rotor is rotated by electromagnetic interaction with the stator, thereby rotating a fan assembly installed in a rotating shaft of the rotor, to perform air conditioning.

Korean Patent No. 10-1755881 discloses a structure in which a stepped portion is formed in the surface in contact with the heat sink so that air introduced into the blower motor is concentrated to devices mounted on the printed circuit board, which are the main heating source, so as to effectively dissipate heat of the devices. This prior art mentions a structure for cooling heat generated from the devices, but does not mention how to handle heat generated from the stator.

Accordingly, the present inventors suggest a blower motor with a novel structure capable of effectively cooling heat generated from a stator assembly and a printed circuit board, and minimizing the size and weight of the motor.

SUMMARY OF THE INVENTION

Task to be Solved

It is an object of the present invention to provide a blower motor with a novel structure capable of effectively cooling heat generated from a stator assembly and a printed circuit board.

It is another object of the present invention to provide a blower motor with a novel structure capable of reducing the size of the motor and lightening the weight thereof.

The above and other inherent objects of the present invention may all be easily achieved by the description of the present invention described below.

Means for Solving Task

The blower motor according to the present invention comprises a stator assembly 1 comprising a stator core 10, an upper insulator 11 coupled to an upper portion of the stator core 10, and a lower insulator 12 coupled to a lower portion of the stator core 10; a rotor assembly 2 rotating around the stator assembly 1; a stator block 3 to which the stator assembly 1 is coupled; a printed circuit board 4 located at a lower portion of the stator block 3; and a motor cover 5 coupled to the stator block 3.

In the present invention, the stator core 10 may comprise a core base 101 having a cylindrical shape, a plurality of teeth 102 formed radially on an outer surface of the core base 101 at regular intervals, a central cylindrical body 103 located inside the core base 101 and having a central coupling hole 103A thereinside, and a plurality of through holes 105 in a space between the core base 101 and the central cylindrical body 103.

In the present invention, the blower motor may further comprise a plurality of ribs 104 connecting an outer circumferential portion of the core base 101 and an inner circumferential portion of the central cylindrical body 103.

In the present invention, the upper insulator 11 may comprise an upper base 111 located at an upper portion of the core base 101, upper teeth 112 for covering an upper portion of the teeth 102 for insulation, a first annular protrusion 113 protruding upwardly from the upper base 111, and a second annular protrusion 114 having an upper central space 114A and located at an upper portion of the central cylindrical body 103.

In the present invention, the blower motor may further comprise a plurality of flow passages 116 between the first annular protrusion 113 and the second annular protrusion 114.

In the present invention, the blower motor may further comprise a plurality of connection ribs 115 connecting the first annular protrusion 113 and the second annular protrusion 114.

In the present invention, preferably, an upper bearing B1 is inserted into the upper central space 114A.

In the present invention, a plurality of coil guides 117 may be formed protruding radially on an outer circumferential surface of the first annular protrusion 113 at regular intervals.

In the present invention, the lower insulator 12 may comprise a lower base 121 located at a lower portion of the core base 101, lower teeth 122 for covering a lower portion of the teeth 102 for insulation, and a lower annular protrusion 123 protruding downwardly from the lower base 121.

In the present invention, the lower insulator 12 may further comprise an inner support 124 having a coupling space 124A in the center and protruding toward the shaft from the lower base 121.

In the present invention, a coupling guide 125 may be formed protruding upwardly in the inner support 124 at regular intervals.

In the present invention, the lower annular protrusion 123 may have at least one first terminal groove 123A.

In the present invention, the lower annular protrusion 123 may have at least one second terminal groove 123B.

Effect of Invention

The present invention has an effect of providing a blower motor with a novel structure capable of effectively cooling heat generated from a stator assembly and a printed circuit board, and reducing the size of the motor and lightening the weight thereof.

Hereinafter, the present invention will be described in detail with reference to the accompanying drawings.

DETAILED DESCRIPTION OF THE INVENTION

Figure 1:
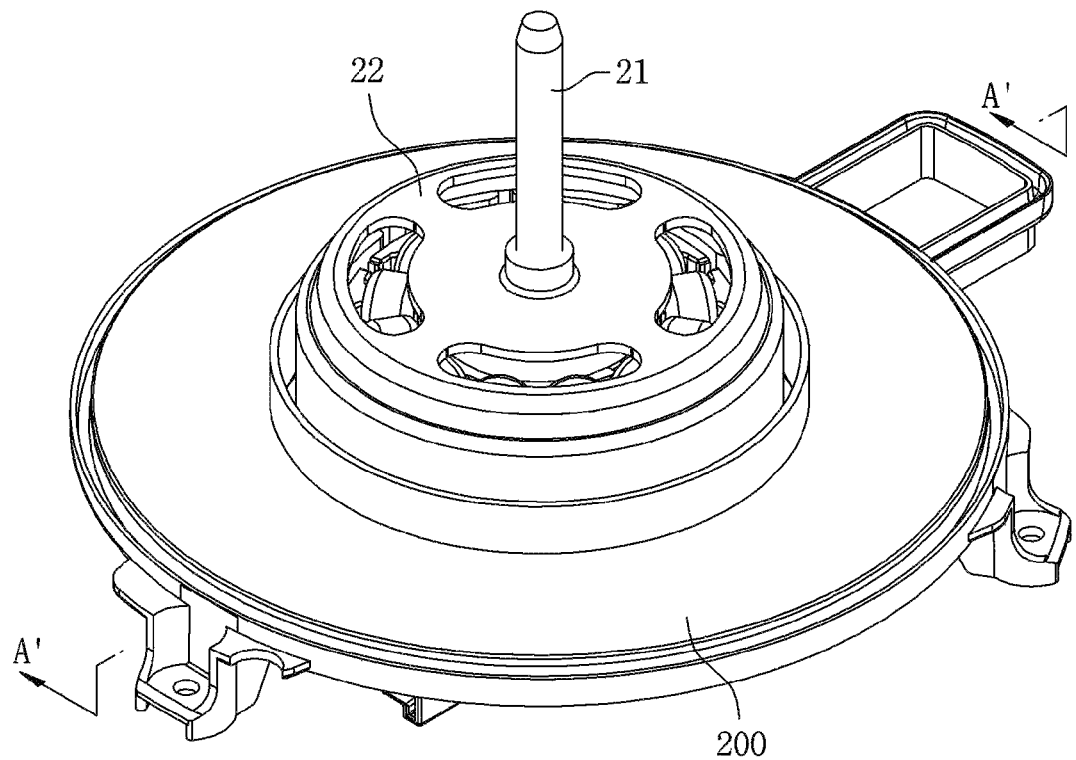
FIG. 1 is a perspective view of a blower motor according to the present invention.
Figure 2:
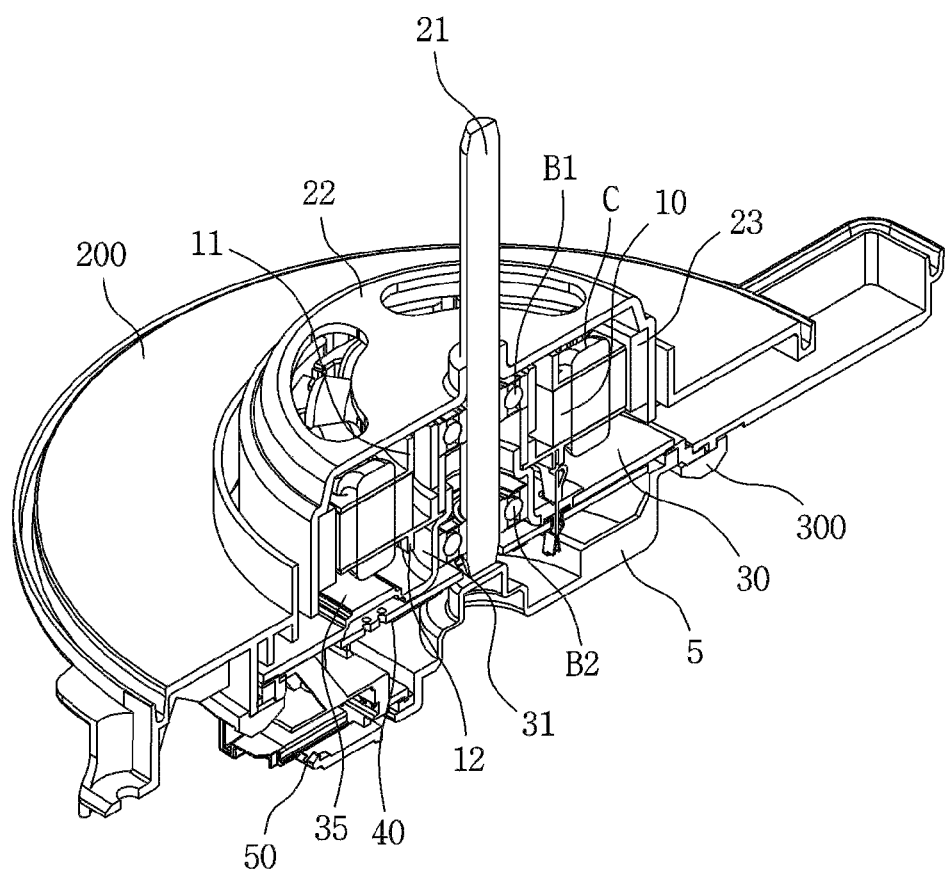
FIG. 2 is a cut-away perspective view of the blower motor in FIG. 1 taken along line A-A'.
Figure 3:
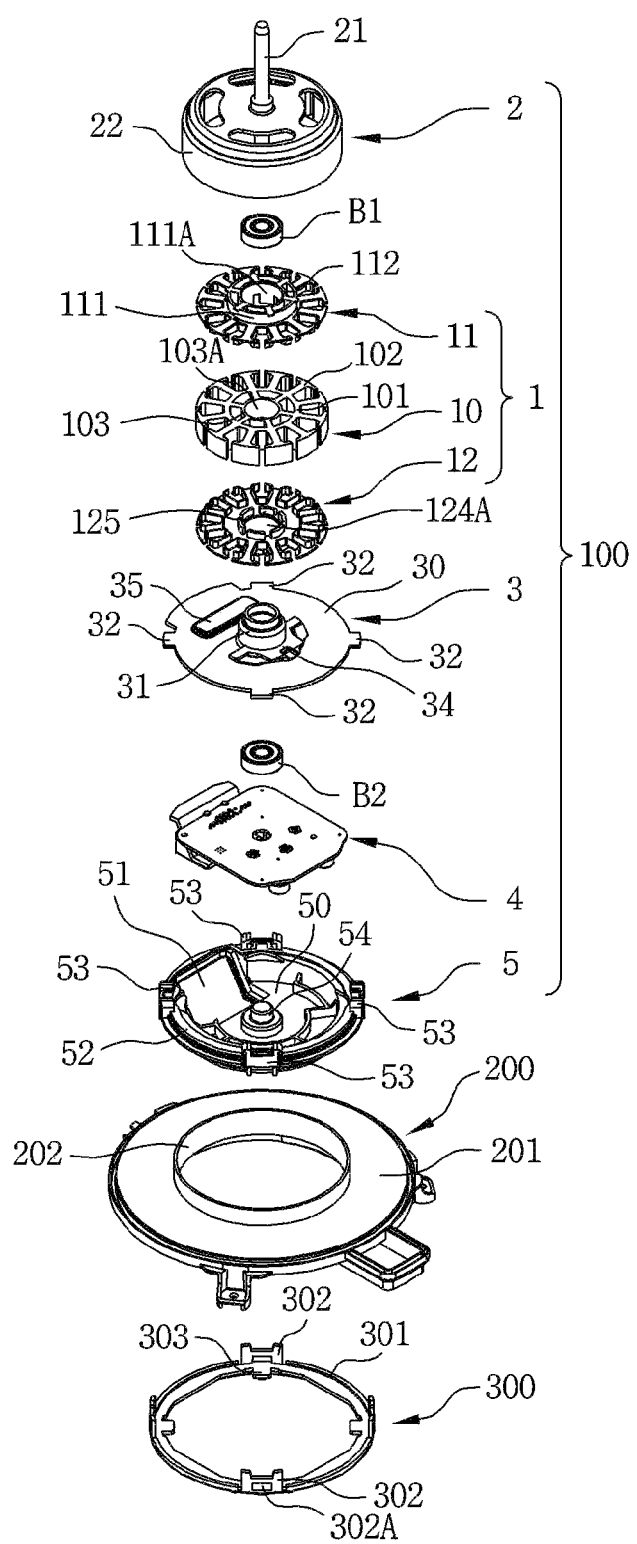
FIG. 3 is an exploded perspective view of a blower motor according to the present invention.
Figure 4:
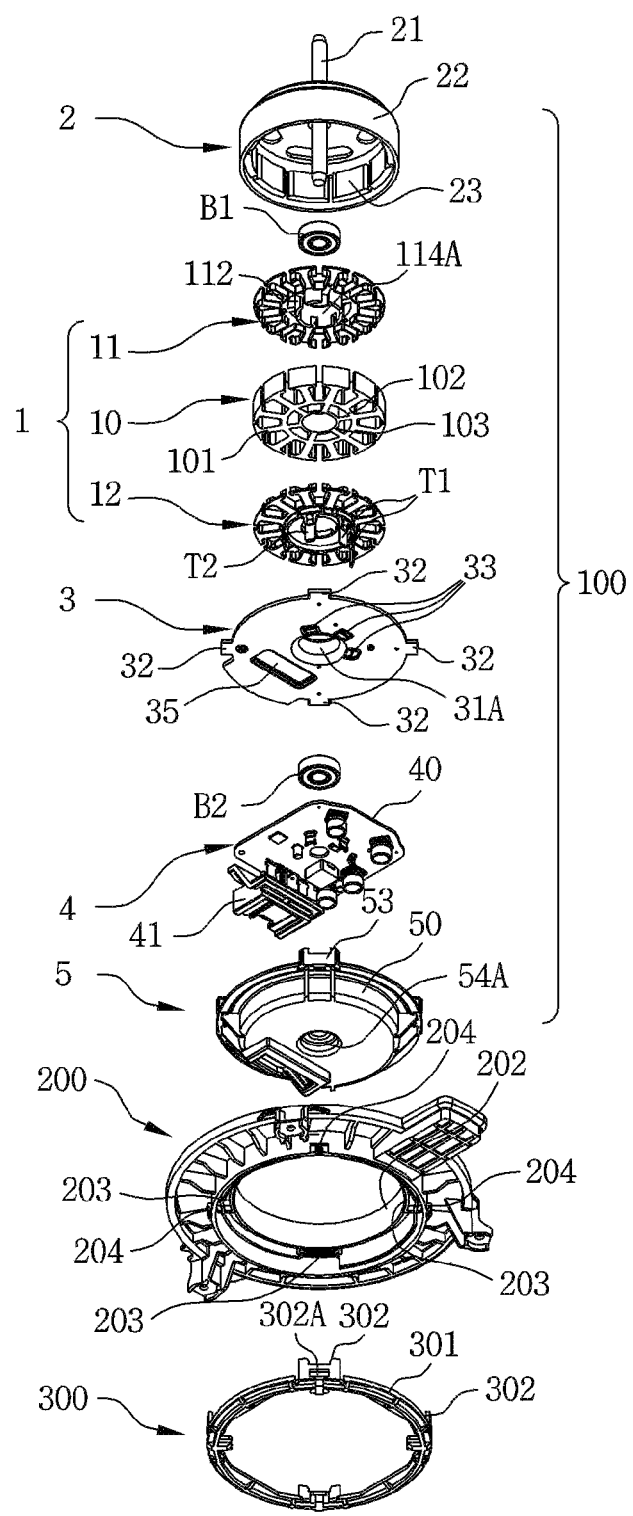
FIG. 4 is a bottom exploded perspective view of a blower motor according to the present invention.

FIG. 1 is a perspective view of a blower motor according to the present invention. FIG. 2 is a cut-away perspective view of the blower motor in FIG. 1 taken along line A-A'. FIG. 3 is an exploded perspective view of a blower motor according to the present invention. FIG. 4 is a bottom exploded perspective view of a blower motor according to the present invention.

Referring to FIGS. 1 to 4 together, the blower motor according to the present invention comprises a motor assembly 100, a flange 200 and a damper plate 300.

The motor assembly 100 comprises a stator assembly 1, a rotor assembly 2, a stator block 3, a printed circuit board 4, and a motor cover 5. The motor assembly 100 is seated on the flange 200, and the damper plate 300 is coupled to the flange 200 to prevent the motor assembly 100 from dislodging.

The stator assembly 1 comprises a stator core 10, an upper insulator 11 and a lower insulator 12. The stator core 10 has a core base 101 having a cylindrical shape and a plurality of teeth 102 formed radially on an outer surface of the core base 101 at regular intervals. The upper insulator 11 is coupled to an upper portion of the stator core 10, and the lower insulator 12 is coupled to a lower portion of the stator core 10. A coil C is wound around the teeth 102 according to a predetermined pattern. An end of the wound coil C is electrically connected to a first terminal T1 and a second terminal T2 protruding downwardly from the lower insulator 12.

The rotor assembly 2 comprises a shaft 21, a rotor housing 22 having a cup shape, to which the shaft 21 is coupled and which rotates with the shaft 21, and a plurality of magnets 23 attached along an inner wall of the rotor housing 22 at regular intervals. The rotor assembly 2 is installed to enclose the stator assembly 1, and is rotated by a changing magnetic field generated by the stator assembly 1. The shaft 21 is rotatably supported by an upper bearing B1 and a lower bearing B2. The upper bearing B1 is installed in a central portion of the upper insulator 11. The lower bearing B2 is installed in a central portion of the stator block 3.

The stator assembly 1 is coupled to an upper portion of the stator block 3, and the printed circuit board 4 is located at a lower portion of the stator block 3. The stator block 3 comprises a plate 30 having a circular shape, a hollow protrusion 31 protruding upwardly from a central portion of the plate 30, a protruding coupler 32 protruding radially from a periphery of the plate 30 at regular intervals, a through hole 33 formed through vertically around the hollow protrusion 31 of the plate 30, through which the first and second terminals T1, T2 pass, an insulating member 34 for closing the through hole 33, and a device groove 35 for receiving a portion in which some devices mounted on the printed circuit board 4 protrude. Preferably, the plate 30 is made of aluminum, which has high electrical and thermal conductivity.

The stator assembly 1 is coupled to the hollow protrusion 31 of the stator block 3. The lower bearing B2 rotatably supporting the shaft 21 is coupled to an inner space 31A inside the hollow protrusion 31.

The printed circuit board 4 comprises a substrate 40 on which various devices are mounted, and a connector 41 installed on one side of the substrate 40 to be connected to an external power source. The first and second terminals T1, T2 are electrically connected to the substrate 40. The circuits on the substrate 40 are physically and electrically connected to the plate 30 of the stator block 3, which allows the circuits to be grounded.

The motor cover 5 comprises a cover body 50 having a cup shape, a connector coupling part 51 opening a portion of one side the cover body 50, a packing part 52 along an upper periphery of the cover body 50, a plurality of damper parts 53 protruding upwardly from an upper periphery of the cover body 50 at regular intervals, a central protrusion 54 protruding upwardly from a lower central portion of the cover body 50, and a central groove 54A forming an inner space of the central protrusion 54 in a lower center of the cover body 50.

The connector 41 is coupled to the connector coupling part 51. The packing part 52 made of a material such as rubber is formed around the cover body 50 and the connector coupling part 51. Accordingly, the inner space of the motor cover 5 is sealed from the outside in a state where the motor cover 5 is coupled to the stator block 3, thereby blocking the introduction of moisture from a lower portion of the motor cover 5.

The damper part 53 made of a material such as rubber protrudes upwardly from a periphery of the cover body 50. The protruding coupler 32 of the stator block 3 is coupled to the damper part 53. Accordingly, the position and number of the protruding coupler 32 are set to be the same as the position and number of the damper part 53. The damper part 53 is located in a damper seating part 203 of the flange 200 to perform decoupling such that vibration generated from the motor assembly 100 is not transmitted to the flange 200.

The central protrusion 54 is located in the inner space 31A of the stator block 3, such that an upper surface of the central protrusion 54 supports a lower end of the shaft 21 when the shaft 21 of the rotor assembly 2 is press fitted into the lower bearing B2. At this time, a jig (not illustrated) is located in the central groove 54A, which is an inner space of the central protrusion 54, such that the upper surface of the central protrusion 54 supports the lower end of the shaft 21.

The flange 200 comprises a flange body 201 having a hole in the center, into which the motor assembly 100 is inserted, an upper protrusion 202 having an annular shape protruding upwardly along a periphery of the hole into which the motor assembly 100 is inserted, a damper seating part 203 formed in the shape of a groove at a position corresponding to the damper part 53, and a coupling protrusion 204 formed in the shape of a protrusion on a lower portion of the flange body 201 at a position corresponding to a locking part 302 of the damper plate 300.

A portion of the rotor assembly 2 is located inside the upper protrusion 202 to rotate. The damper part 53 of the motor cover 5 is seated on the damper seating part 203 having a groove shape. The damper part 53 is a buffering member made of a material such as rubber to absorb vibration generated from the motor assembly 100. The damper part 53, which is seated on the damper seating part 203 of the flange 200, reduces vibration generated from the motor assembly 100.

The damper plate 300 has an annular body 301 having a ring shape, a plurality of locking parts 302 protruding upwardly from a periphery of the annular body 301 at regular intervals, and a plurality of protrusion guides 303 protruding toward the shaft 21 from a periphery of the annular body 301 at regular intervals. The locking part 302 has a locking hole 302A, and the locking hole 302A is coupled to the coupling protrusion 204. The locking hole 302A may be modified to have a protrusion shape, and the coupling protrusion 204 may be modified to have a hole or groove shape. The protrusion guide 303 supports the motor cover 5 to prevent the motor assembly 100 from dislodging downwardly.

Figure 5:
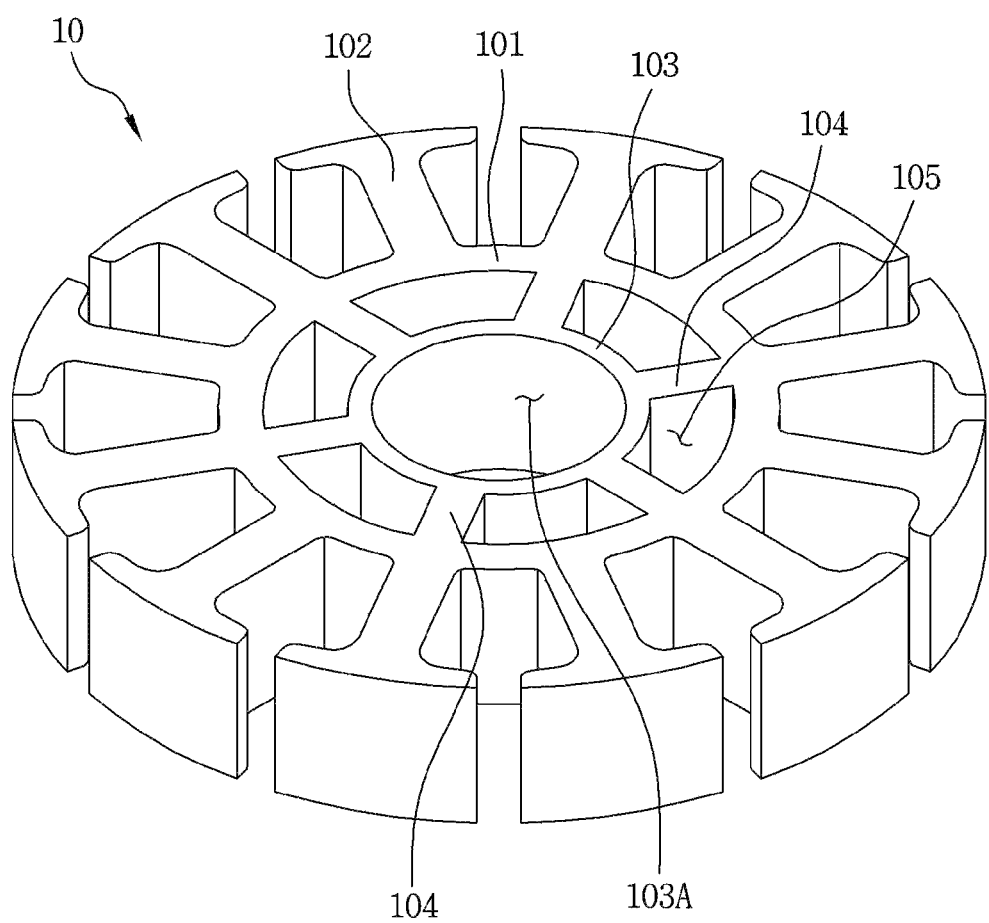
FIG. 5 is a perspective view of a stator core of a blower motor according to the present invention.

FIG. 5 is a perspective view of a stator core 10 of a blower motor according to the present invention.

As illustrated in FIG. 5, the stator core 10 of the blower motor according to the present invention comprises a core base 101 having a cylindrical shape with a hollow interior, a plurality of teeth 102 formed radially from an outer periphery of the core base 101, a central cylindrical body 103 located inside the core base 101 and having a central coupling hole 103A thereinside, a plurality of ribs 104 connecting an outer circumferential portion of the core base 101 and an inner circumferential portion of the central cylindrical body 103, and a plurality of through holes 105 in a space between the core base 101 and the central cylindrical body 103. The stator core 10 is manufactured by continuously forming a thin electrical steel sheet by press punching and laminating the same.

A coil C is wound around each of the teeth 102 while being insulated by the upper and lower insulators 11, 12. The hollow protrusion 31 of the stator block 3 is press fitted and coupled to the central coupling hole 103A inside the central cylindrical body 103. The plurality of through holes 105 provides air passages to dissipate heat generated from the stator core 10, etc.

Figure 6:
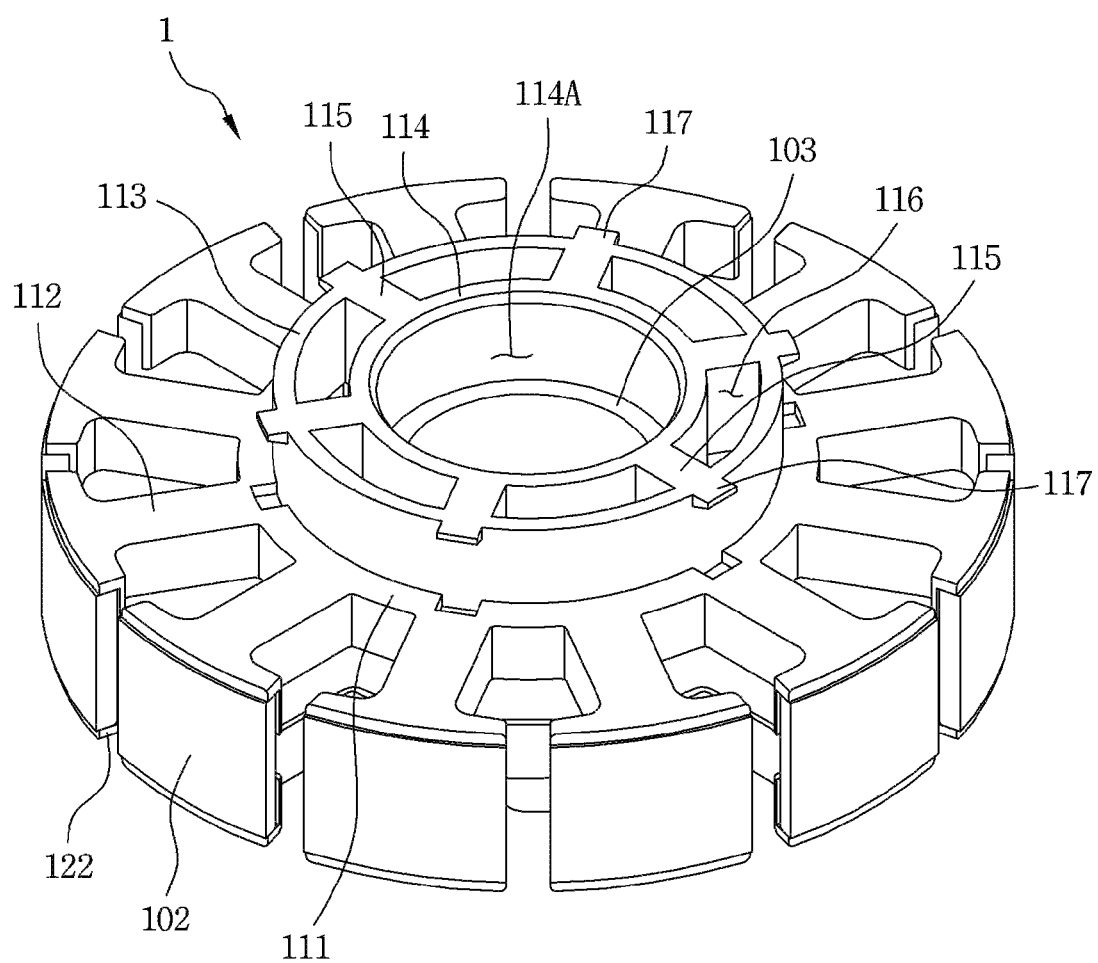
FIG. 6 is a perspective view of a stator assembly of a blower motor according to the present invention.
Figure 7:
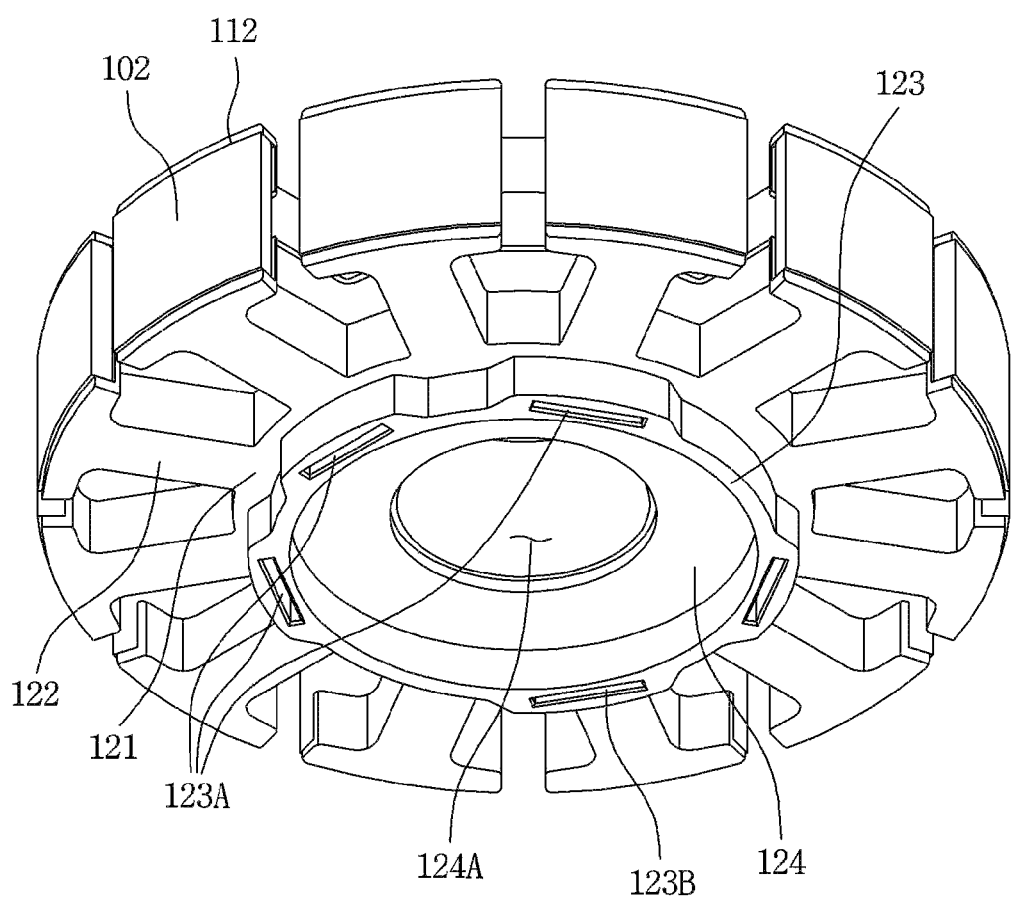
FIG. 7 is a bottom perspective view of a stator assembly of a blower motor according to the present invention.

FIG. 6 is a perspective view of a stator assembly 1 of a blower motor according to the present invention. FIG. 7 is a bottom perspective view of a stator assembly 1 of a blower motor according to the present invention.

Referring to FIGS. 6 and 7 together, the stator assembly 1 of the blower motor according to the present invention comprises a stator core 10, an upper insulator 11 coupled to an upper portion of the stator core 10, and a lower insulator 12 coupled to a lower portion of the stator core 10.

The upper insulator 11 comprises an upper base 111 located at an upper portion of the core base 101 of the stator core 10, upper teeth 112 for covering an upper portion of the teeth 102 for insulation, a first annular protrusion 113 protruding upwardly from the upper base 111, a second annular protrusion 114 having an upper central space 114A and located at an upper portion of the central cylindrical body 103, a plurality of connection ribs 115 connecting the first annular protrusion 113 and the second annular protrusion 114, and a plurality of flow passages 116 between the first annular protrusion 113 and the second annular protrusion 114.

An upper bearing B1 is coupled in the upper central space 114A. According to the present invention, the upper bearing B1 is coupled to the upper insulator 11 of the stator assembly 1. This structure may exclude the use of other components for coupling the upper bearing B1, which makes the motor compact and light weight.

The flow passage 116 is formed to be in vertical communication with the through hole 105 of the stator core 10, which helps cooling heat generated from the stator core 10, etc.

A coil guide 117 protrudes radially from an outer circumferential surface of the first annular protrusion 113 at regular intervals. The coil guide 117 allows the coil C wound around the upper teeth 112 not to deviate from the original position.

The lower insulator 12 comprises a lower base 121 located at a lower portion of the core base 101 of the stator core 10, lower teeth 122 for covering a lower portion of the teeth 102 for insulation, a lower annular protrusion 123 protruding downwardly from the lower base 121, and an inner support 124 having a coupling space 124A in the center and protruding toward the shaft from the lower base 121.

The lower annular protrusion 123 has at least one first terminal groove 123A and at least one second terminal groove 123B. The first terminal T1 is coupled to the first terminal groove 123A, and the second terminal T2 is coupled to the second terminal groove 123B. An end of the coil wound around the stator assembly 1 is electrically connected to the first terminal T1 and the second terminal T2. An end of the coil of each phase of the motor is electrically connected to the first terminal T1, and the coil connecting the neutral point of each phase is electrically connected to the second terminal T2. The number of the first terminals T1 and the second terminals T2 may vary depending on the specifications, number of phases, etc., of the motor. The first terminal groove 123A and the second terminal groove 123B may have a hole shape, instead of a groove shape, despite the names thereof.

The hollow protrusion 31 of the stator block 3 is coupled in the coupling space 124A which is an inner space of the inner support 124. A coupling guide 125 (illustrated in FIG. 3) protruding upwardly from the inner support 124 at regular intervals may be coupled to an inside of the flow passage 116 of the stator core 10.

It should be noted that the description of the present invention described above is merely an example for understanding the present invention, and is not intended to limit the scope of the present invention. It should be construed that the scope of the present invention is defined by the appended claims, and all modifications and alternations of the present invention fall within the protection scope of the present invention.

The invention claimed is:

1. A blower motor comprising:
    a stator assembly (1) comprising a stator core (10), an upper insulator (11) coupled to an upper portion of the stator core (10), and a lower insulator (12) coupled to a lower portion of the stator core (10);
    a rotor assembly (2) rotating around the stator assembly (1);
    a stator block (3) to which the stator assembly (1) is coupled;
    a printed circuit board (4) located at a lower portion of the stator block (3); and
    a motor cover (5) coupled to the stator block (3),
    wherein the stator core (10) comprises a core base (101) having a cylindrical shape, a plurality of teeth (102)

formed radially on an outer surface of the core base (101) at regular intervals, a central cylindrical body (103) located inside the core base (101) and having a central coupling hole (103A) thereinside, and a plurality of through holes (105) in a space between the core base (101) and the central cylindrical body (103); and wherein the upper insulator (11) comprises an upper base (111) located at an upper portion of the core base (101), upper teeth (112) for covering an upper portion of the teeth (102) for insulation, a first annular protrusion (113) protruding upwardly from the upper base (111), and a second annular protrusion (114) having an upper central space (114A) and located at an upper portion of the central cylindrical body (103).

2. The blower motor of claim 1, further comprising a plurality of ribs (104) connecting an outer circumferential portion of the core base (101) and an inner circumferential portion of the central cylindrical body (103).

3. The blower motor of claim 1, further comprising a plurality of flow passages (116) between the first annular protrusion (113) and the second annular protrusion (114).

4. The blower motor of claim 3, further comprising a plurality of connection ribs (115) connecting the first annular protrusion (113) and the second annular protrusion (114).

5. The blower motor of claim 1, wherein an upper bearing (B1) is inserted into the upper central space (114A).

6. The blower motor of claim 1, wherein a plurality of coil guides (117) are formed protruding radially on an outer circumferential surface of the first annular protrusion (113) at regular intervals.

7. The blower motor of claim 1, wherein the lower insulator (12) comprises a lower base (121) located at a lower portion of the core base (101), lower teeth (122) for covering a lower portion of the teeth (102) for insulation, and a lower annular protrusion (123) protruding downwardly from the lower base (121).

8. The blower motor of claim 7, wherein the lower insulator (12) further comprises an inner support (124) having a coupling space (124A) in the center and protruding toward the shaft from the lower base (121).

9. The blower motor of claim 8, wherein a coupling guide (125) is formed protruding upwardly in the inner support (124) at regular intervals.

10. The blower motor of claim 7, wherein the lower annular protrusion (123) has at least one first terminal groove (123A).

11. The blower motor of claim 10, wherein the lower annular protrusion (123) has at least one second terminal groove (123B).

* * * * *